US006032976A

United States Patent [19]

Dickie et al.

[11] Patent Number: 6,032,976

[45] Date of Patent: Mar. 7, 2000

[54] WHEELCHAIR WITH TILTING SEAT

[75] Inventors: Paul C. Dickie, Clovis, Calif.; Dalva R. Alexander, Houston, Tex.

[73] Assignee: Sunrise Medical HHG Inc., Longmont, Colo.

[21] Appl. No.: 09/191,984

[22] Filed: Nov. 13, 1998

Related U.S. Application Data

[63] Continuation-in-part of application No. 08/924,922, Sep. 8, 1997, abandoned.

[51] Int. Cl.[7] ........ B60K 1/02

[52] U.S. Cl. ........ 280/650; 280/250.1; 180/65.6; 297/DIG. 4

[58] Field of Search ........ 180/907, 65.6; 280/250.1, 304.1, 650; 297/325, 322, 326, 328, 362.13, 344.11, 344.13, DIG. 4; 5/86.1, 617

[56] References Cited

U.S. PATENT DOCUMENTS

| | | | |
|---|---|---|---|
| 2,091,063 | 8/1937 | Ball | 155/116 |
| 2,578,828 | 12/1951 | Nelson | 280/266 |
| 3,191,990 | 6/1965 | Rugg et al. | 297/83 |
| 4,183,578 | 1/1980 | Naganawa | 297/90 |
| 4,333,681 | 6/1982 | Nelson | 297/83 |
| 4,614,246 | 9/1986 | Masse et al. | 180/6.5 |
| 4,616,874 | 10/1986 | Pietsch et al. | 297/321 |
| 4,877,291 | 10/1989 | Taylor | 297/321 |
| 5,044,647 | 9/1991 | Patterson | 280/250.1 |
| 5,297,021 | 3/1994 | Koerlin et al. | 364/167.01 |
| 5,531,284 | 7/1996 | Okamoto | 180/65.1 |
| 5,540,297 | 7/1996 | Meier | 180/65.5 |
| 5,542,690 | 8/1996 | Kozicki | 280/304.1 |
| 5,549,357 | 8/1996 | Counts et al. | 297/354.13 |
| 5,555,949 | 9/1996 | Stallard et al. | 180/6.5 |
| 5,575,348 | 11/1996 | Goertzen et al. | 180/65.5 |
| 5,592,997 | 1/1997 | Ball | 180/65.1 |
| 5,722,726 | 3/1998 | Matsumiya | 297/322 |
| 5,774,914 | 9/1998 | Johnson et al. | 5/602 |

FOREIGN PATENT DOCUMENTS

| | | |
|---|---|---|
| 2 158 350 | 11/1985 | United Kingdom . |

*Primary Examiner*—Peter C. English
*Assistant Examiner*—Lynda Jasmin
*Attorney, Agent, or Firm*—MacMillan, Sobanski & Todd, LLC

[57] ABSTRACT

One aspect of the present invention is a wheelchair that has a tiltable seat The wheelchair comprises a base frame, a seat frame, a plurality of pivotable side connection members, and at least one drive member. The base frame comprises a plurality of substantially parallel base frame side members, each supporting a longitudinally movable connection. A longitudinally movable support member is slidably connected at each end to the longitudinally movable connection. The seat frame is tiltable relative to the base frame. The seat frame comprises a plurality of substantially parallel seat frame side members, each having a front end and a back end, The back end of each of the seat frame side members is connected to the longitudinally movable support member. The pivotable side connection members each have an upper end and a lower end. The upper end is pivotally connected to a seat frame side member at a point on the seat frame side member that is forward of the point on the seat frame side member where the seat frame side member is connected to the longitudinally movable support member. The lower end is pivotally connected to a base frame side member at a point on the base frame side member that is forward of the longitudinal retaining slot. The drive member is attached to the longitudinally movable support member and is capable of moving the longitudinally movable support member forward and backward.

14 Claims, 6 Drawing Sheets

WHEELCHAIR WITH TILTING SEAT

CROSS-REFERENCE TO RELATED APPLICATIONS

This application is a continuation-in-part of U.S. patent application Ser. No. 08/924,922, filed on Sep. 8, 1997, now abandoned.

TECHNICAL FIELD OF THE INVENTION

The present invention relates to wheelchairs, and particularly to wheelchairs having a motor capable of shifting the position of the seat of the wheelchair.

BACKGROUND OF THE INVENTION

Wheelchairs often have a fixed seating surface that is either horizontal or slightly tilted back (i.e., the front edge of the seating surface is slightly higher than the rear edge of that surface). If a person sits in the same position in a wheelchair for a long period of time, pressure is continuously applied to the tissue on the buttocks, legs, and/or back that is bearing the person's weight in that position. Blood circulation to that tissue will be reduced, and ulcers or other problems can result.

To avoid these problems, it is necessary for people sitting in wheelchairs to shift their body weight from time to time. One way to accomplish this is for a nurse or attendant to manually tilt the entire wheelchair, or the seat portion of the wheelchair, backwards, so that the occupant's weight is shifted and the pressure point on the occupant's body is moved. However, it is desirable for the person in the wheelchair to be able to make this shift in position on her own, without assistance from an attendant.

To accomplish this, wheelchairs are sometimes provided with a motor-driven tilting apparatus. The occupant of the wheelchair can activate a switch or other control mechanism on the wheelchair, causing a motor to tilt the seat of the wheelchair, while the wheels and supporting frame stay in the same position. However, tilting the wheelchair seat in this manner also shifts the center of gravity of the occupant toward the rear of the wheelchair. The further back the center of gravity moves, the easier it is for the wheelchair and its occupant to tip over backward. This risk of injury to the occupant from tipping over is a serious problem, since the occupant of the wheelchair will typically have some physical disability that will make it difficult for her to break a fall.

To address this problem, wheelchairs are sometimes provided with a moveable pivot point upon which the wheelchair seat is mounted. A linear actuator is provided to raise the front end of the seat and tilt the seat back. However, the actuator demands a significant amount of vertical space. The seat of the wheelchair must be elevated to meet this demand. The wheelchair occupant typically disfavors the increased elevation.

There is a long-standing need for a wheelchair that allows the occupant to tilt the wheelchair's seat back while keeping the center of gravity as close as possible to the midpoint between the front and back axles, but that allows the elevation of the seat to remain unaffected.

SUMMARY OF THE INVENTION

One aspect of the present invention is a wheelchair that has a tiltable seat. The wheelchair comprises a base frame, a seat frame, a plurality of pivotable side connection members, and at least one drive member. The base frame comprises a plurality of substantially parallel base frame side members, each having attached thereto a longitudinally movable connection, and a longitudinally movable support member having opposing ends connected to the displaceable connection. "Longitudinally movable" in this context means that the connection and support member can move forward or backward because the connection or member, or some suitable structure attached to the connection or member, can roll or slide forward and backward.

The seat frame is tiltable relative to the base frame, and comprises a plurality of substantially parallel seat frame side members. Each seat frame side member has a front end and a back end. The back end of each of the seat frame side members is connected to the longitudinally movable support member. The pivotable side connection members each have an upper end and a lower end. The upper end is pivotally connected to a seat frame side member at a point on the seat frame side member that is forward of the point on the seat frame side member where the seat frame side member is connected to the longitudinally movable support member. The lower end is pivotally connected to a base frame side member at a point on the base frame side member that is forward of the longitudinally movable connection. The drive member is attached to the longitudinally movable support member and is capable of moving the longitudinally movable support member forward and backward.

The base frame has at least three wheels; usually four wheels attached to it. The electric motor that drives the wheels will typically also be located somewhere on the base frame. This type of modular construction gives a manufacturer the option to obtain a base frame (with wheels and drive motor) from one source and the seat frame and seat as a unit from a separate source.

A preferred embodiment of the invention, a wheelchair includes a base frame comprising two substantially parallel base frame side members, a seat frame comprising two substantially parallel seat frame side members, and two pivotable side connection members. A drive member, preferably powered by an electric motor, is mounted on the base frame. The seat frame will typically support a padded seat and padded armrests.

Various objects and advantages of this invention will become apparent to those skilled in the art from the following detailed description of the preferred embodiment, when read in light of the accompanying drawings.

DETAILED DESCRIPTION OF THE INVENTION

A variety of wheelchairs, including ones powered by electric motors, are known. Examples of wheelchairs are disclosed in U.S. Pat. Nos. 5,044,647; 5,531,284; 5,540,297; 5,542,690; 5,549,357; 5,555,949; 5,575,348; and 5,592,997. Those patents are incorporated herein by reference.

Figure 1:
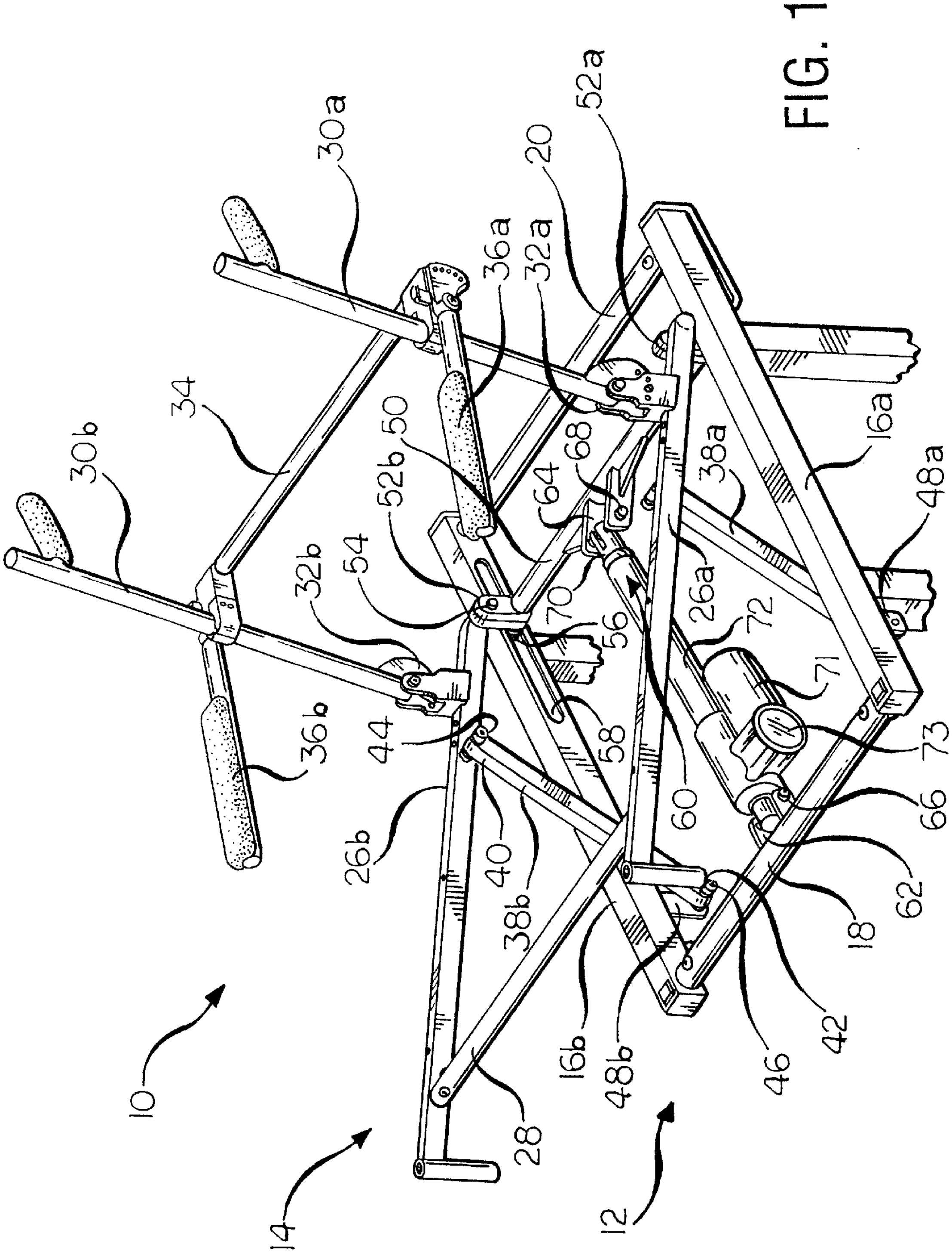
FIG. 1 is a front perspective view of a wheelchair frame in accordance with the present invention.

A wheelchair tilting seat frame 10 is shown in FIG. 1. This tilting seat frame 10 will typically be mounted above a base frame 12 that has the wheels on which the wheelchair rolls, and the electric motors that drive the wheels (see FIG. 5). The tilting seat frame 10 includes a seat frame 14. The base frame 12 includes two base frame side members 16*a* and 16*b*. The base frame side members 16*a* and 16*b* are connected together by a base frame front member 18 and a base frame rear member 20. Bolts or welds can be used to connect the members 16*a*, 16*b*, 18 and 20.

The seat frame 14 includes two seat frame side members 26*a* and 26*b*. A seat frame front member 28 connects the seat frame side members 26*a* and 26*b* together at or near the front ends of the seat frame side members 26*a* and 26*b*. Bolts or welds can provide this connection. The seat frame 14 also includes two seat back support members 30*a* and 30*b*. These members 30*a* and 30*b* can suitably be connected to the seat frame side members 26*a* and 26*b* at one of several angles by means of adjustable angle connectors 32*a* and 32*b*. A seat back cross member 34 can connect the seat back support members 30*a* and 30*b*. Arm rest supports 36*a* and 36*b* can optionally be provided on the seat back support members 30, as shown in FIG. 1, or alternatively supported by members (not shown) running vertically from the seat frame side members 26.

Connections between the base frame 12 and the seat frame 14 are preferably provided at two places on each side of the wheelchair. Pivotable side connection members 38*a* and 38*b* (also referred to as a tilt linkage) provide the first connection. These pivotable side connection members 38*a* and 38*b* each have an upper end 40 and a lower end 42, which can best be seen on member 38*b*. The upper end 40 is pivotally attached, for example, to the seat frame side member 26 on the same side of the wheelchair with a pivot pin 44. The lower end 42 is also pivotally attached, for example, by a pivot pin 46, to the base frame side members 16*a* and 16*b*.

Figure 10:
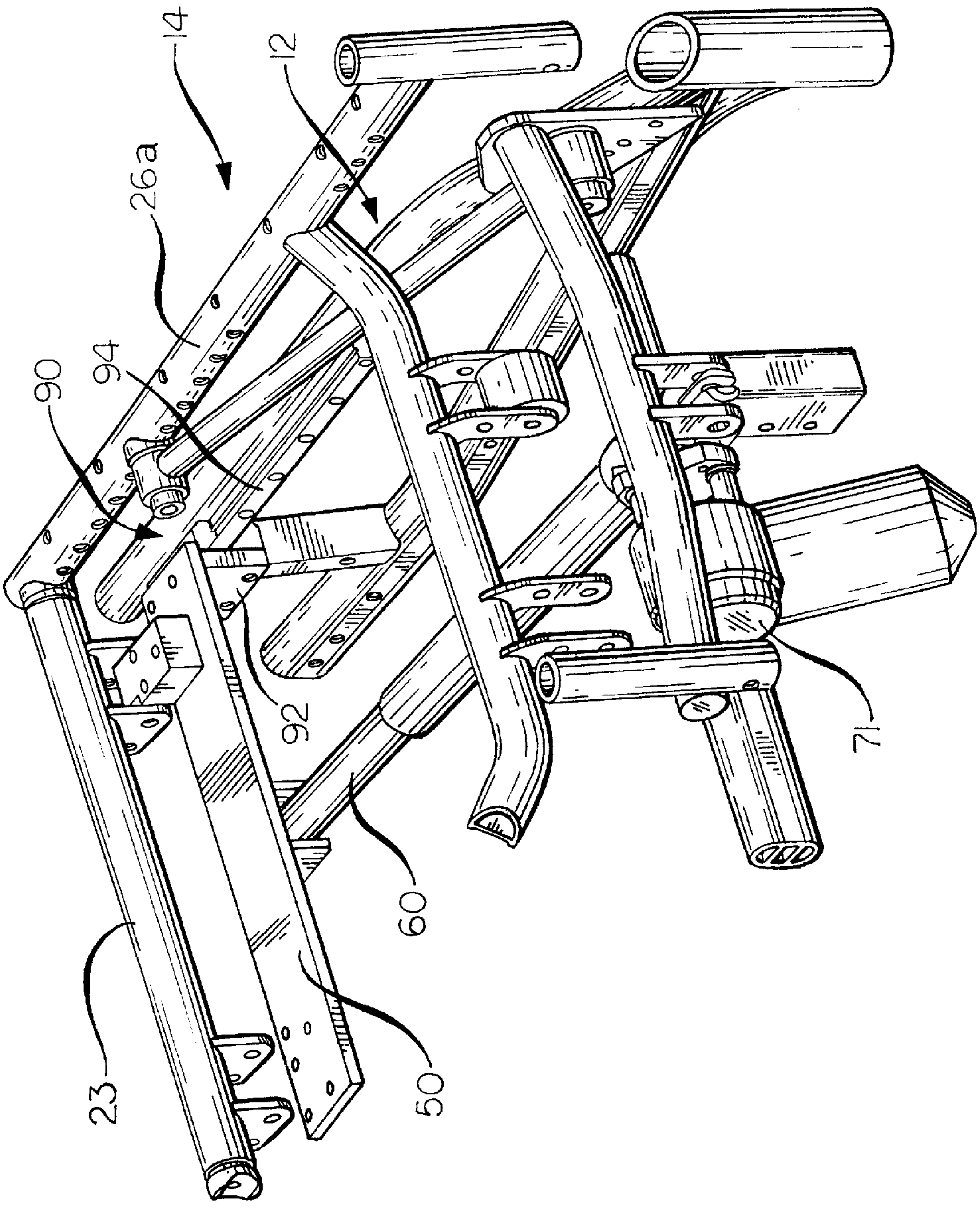
FIG. 10 is a partial front perspective view of an alternative wheelchair and an alternative embodiment of the invention.

The other connection between the base frame 12 and the seat frame 14 is preferably provided near the rear of the seat frame 14. Specifically, a longitudinally movable transverse support member 50 spans the distance between the two base frame side members 16*a* and 16*b*. At or near each end of this member 50 are movable connections, such as vertical tabs 52*a* and 52*b*. The seat frame side members 26*a* and 26*b* have at or near their rear ends a connection, preferably a fixed connection, to these tabs 52*a* and 52*b*, provided for example by bolts 54, or alternatively by welds. Alternatively, the seat frame may be provided with a seat frame rear member 23, as shown in FIG. 10. The seat frame side members 26*a* and 26*b* may be connected together by the seat frame rear member 23, which may be coupled to the movable transverse support member 50, as shown in FIG. 10.

Located at the two ends of the longitudinally movable transverse support member 50 is rolling member 56, such as a wheel or a bearing. This rolling member 56 is located in a longitudinal retaining slot 58, which is located on the inside of each base frame side members 16*a* and 16*b*. The longitudinal retaining slot 58 can suitably consist of, for example, a channel in the base frame side member 16 having a rectangular or oval cross-section. Thus the rolling member 56 can move forward and backward in the slot 58. The longitudinal retaining slot 58 is preferably straight. As an alternative, a sliding member (not shown) could replace the rolling member 56. The sliding member may be coated with Teflon. The sliding member would slide forward and backward in the slot 58.

Figure 6:
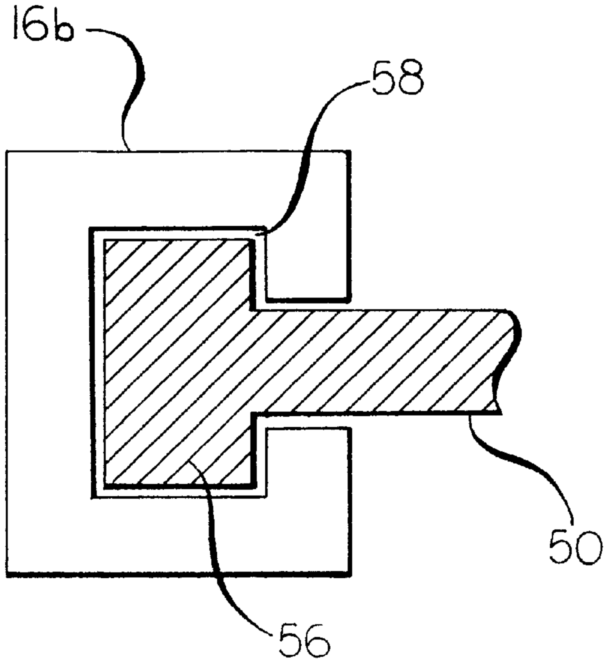
FIG. 6 is a cross-sectional view of a retaining slot and rolling member in accordance with the present invention.
Figure 7:
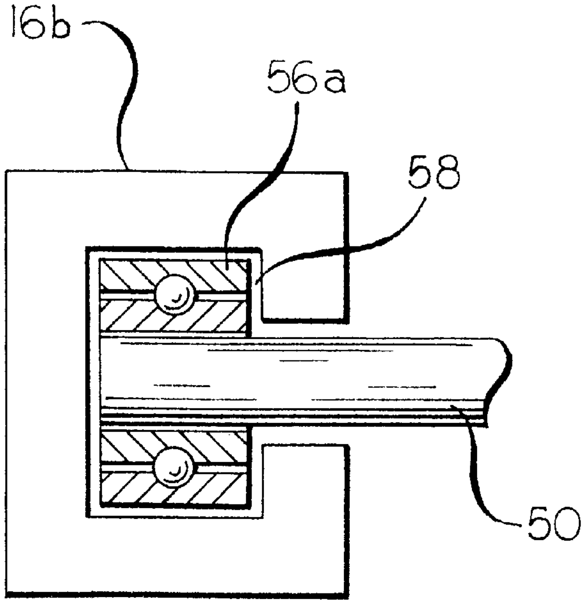
FIG. 7 is a cross-sectional view of a retaining slot and a rolling bearing.
Figure 8:
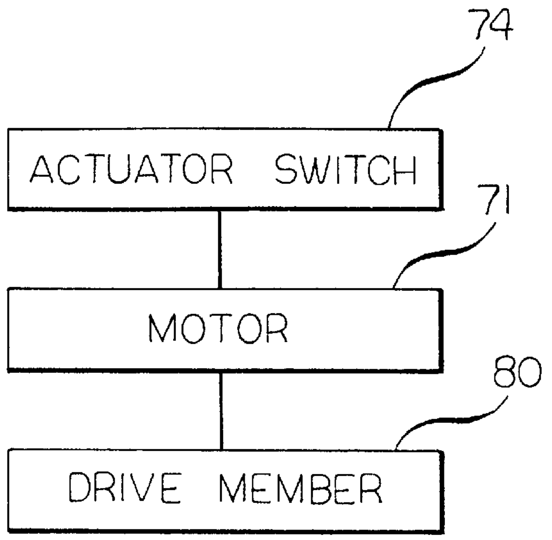
FIG. 8 is a diagrammatic representation of an actuating switch coupled to an electric motor and drive member.

One embodiment of the longitudinal retaining slot 58 is preferably straight and is shown in cross-section in FIG. 6. The slot 58 is located in the mid-height of the base frame side member 16*b*, and has a substantially rectangular cross-section. The rolling member attached to the transverse support member 50 can take the form of a wheel 56 (shown in FIG. 6), rolling bearing 56*a* (shown in FIG. 7), or linear bearing (not shown).

In an alternative embodiment of the invention, a glide system 90 may be substituted in the place of the slot 58 and the rolling member 56, as shown in FIG. 10. The glide system 90 preferably includes a glide box 92 and a glide rail 94. The glide box 92 may be mounted to the base frame 12 in the place of the slot 58 and the glide rail 94 may be mounted to the ends of the longitudinally movable transverse support member 50 in the place of the rolling member 56. Alternatively, the glide rail 94 may be mounted to the base frame 12 in the place of the slot 58 and the box glide 92 may be mount to the ends of the longitudinally movable transverse support member 50 in the place of the rolling member 56. A suitable glide system for use with the invention is the Accuglide® Linear Guide #3 (Miniature Series) manufactured by Thomson Industries, Bay City, Mich., U.S.A.

Returning to FIG. 1, a drive member 60 has two ends. One end connected to the longitudinally movable transverse support member 50. The other end is connected to the base frame front member 18. This connection may be accomplished by means of parallel flat mounting tabs 62 and 64 and pivot pins 66 and 68. The drive member 60 includes an inner shaft 70 and an outer sleeve 72. An electric linear actuator motor 71 provides power that, in connection with gears 73, causes the inner shaft 70 to slide forward into the outer sleeve 72, or to slide backward out of the outer sleeve 72. The electric linear actuator motor 71 will normally be separate from the electric motors that drive the wheels of the wheelchair. The drive motor, and the storage battery that supplies electricity to the motors, will typically be mounted on the base frame 12 (see FIG. 5). An example of a linear actuator suitable for carrying out the invention is a model LA30 manufactured by Linak of Guderup, Denmark, Nordborg.

Figure 2:
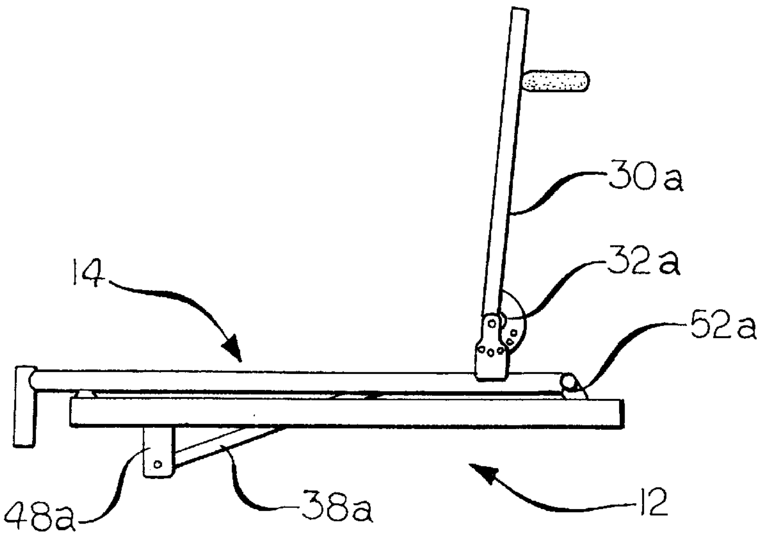
FIGS. 2, 3, and 4 are side views showing a wheelchair frame in the horizontal position, partially tilted position, and nearly fully tilted position, respectively.
Figure 3:
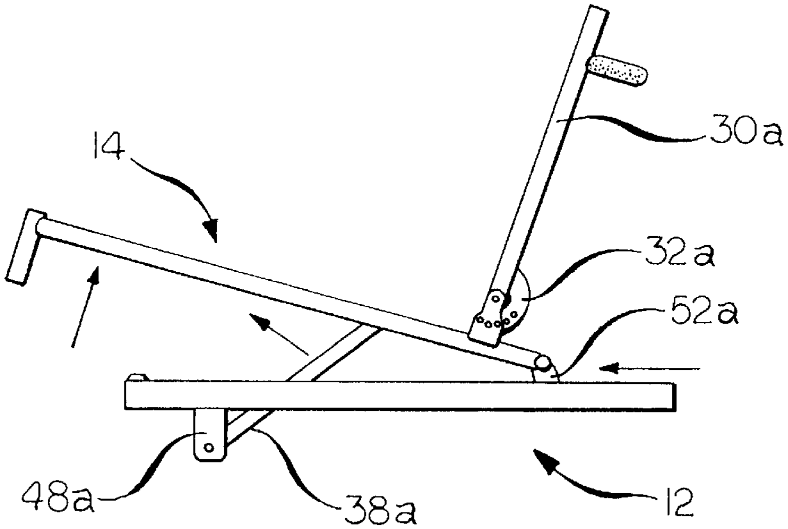
Figure 4:
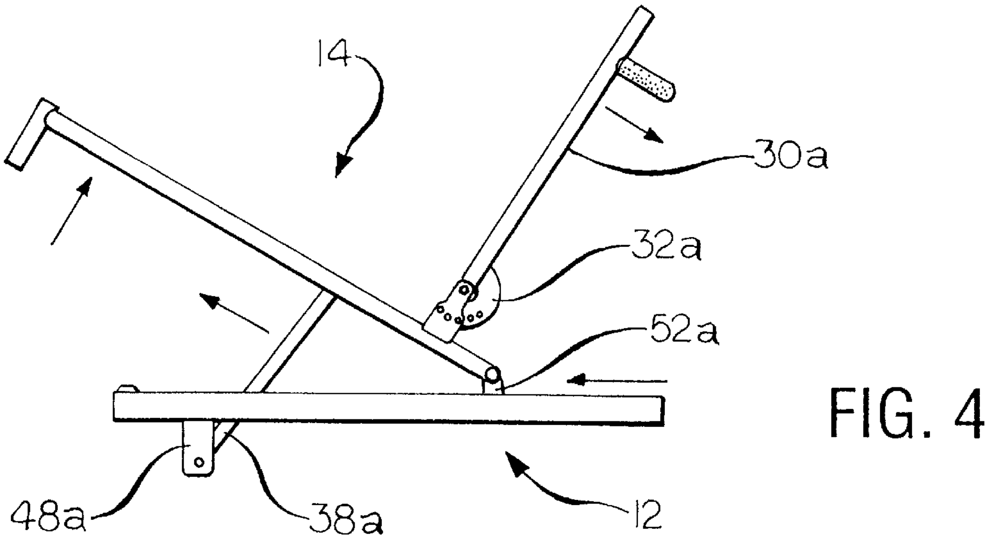

Actuation of the electric motor by the occupant of the wheelchair or an attendant causes the seat frame 14 to tilt relative to the base frame 12 as shown in FIGS. 2–4. This can be effected, for example, by flipping a toggle switch or actuator switch 74 (schematically illustrated in FIG. 9) located on an armrest. In FIG. 2, the seat frame 14 is in its down position, which in this embodiment is parallel to the base frame 12. In other embodiments, the down position for the seat frame would not necessarily have to be parallel to the base frame.

When the electric motor is actuated to cause the inner shaft 70 of the drive member 60 to retract into the outer sleeve 72, the longitudinally movable transverse support member 50 is pulled forward toward the front of the wheelchair. The rolling member 56 on each side rolls forward within the confines of the longitudinal retaining slots 58. The seat frame side member 26*b*, vertical tab 52*b*, and longitudinally movable transverse support member 50 rotate in tandem in a preferred embodiment of the device. In other words, as the front end of seat frame side member 26*b* moves upward, the top of vertical tab 52*b* rotates to the rear, and of course the transverse support member 50 rotates similarly because it is fixedly attached to the vertical tab 52*b* in this embodiment.

As this happens, the pivotable side connection members 38 move to a more vertical position, as shown in FIGS. 3 and 4. At the same time, the seat frame 14 is caused to tilt to the rear by its connections with the pivotable side connection members 38 and the longitudinally movable transverse support member 50. This simultaneous tilting and shifting forward allows the wheelchair occupant to shift her weight while still keeping the center of gravity near the midpoint between the wheelchair's front and rear axles. This helps maximize the stability of the wheelchair and minimizes the risk of injury to the occupant due to tipping over backward.

The extent to which the seat frame is tilted backwards can be controlled by the occupant of the wheelchair (e.g., by turning off the actuator when the seat is sufficiently tilted). Preferably the maximum degree of tilt for the seat is limited by the maximum travel of the linear actuator system (70, 72).

Returning the seat to a more horizontal position simply requires reversal of the movement of the drive member 60. The inner shaft 70 of the drive member 60 moves out of outer sleeve 72. The longitudinally movable transverse support member 50 is pushed backward, again with the rolling member 56 rolling within the confines of the longitudinal retaining slots 58. Of course, this time the rolling member 56 rolls rearward in those slots.

The distance that the rolling member travels from back to front in the slots 58 when the seat is being tilted from its base position to its tilted position is preferably about 5–7 inches. Likewise, the distance that the rolling member travels from front to back when the seat is being returned to its base (untilted) position is preferably about 5–7 inches. Most preferably, these distances are about 6 inches.

The connection between the lower end 42 of the pivotable side connection member 38 and the base frame side member 16 is preferably located between about 50–60% of the distance from the front of the base frame side member 16 to the rear of that member. The connection between the upper end 40 of the pivotable side connection member 38 and the seat frame side member 26 is preferably located between about 50–80% of the distance from the front of the seat frame side member 26 to the rear of that member. The longitudinal retaining slots 58 preferably are located within the range of about 60–90% of the distance from the front of the base frame side member 16 to the rear of that member. The slots 58 are preferably about 6–7 inches long.

Figure 5:
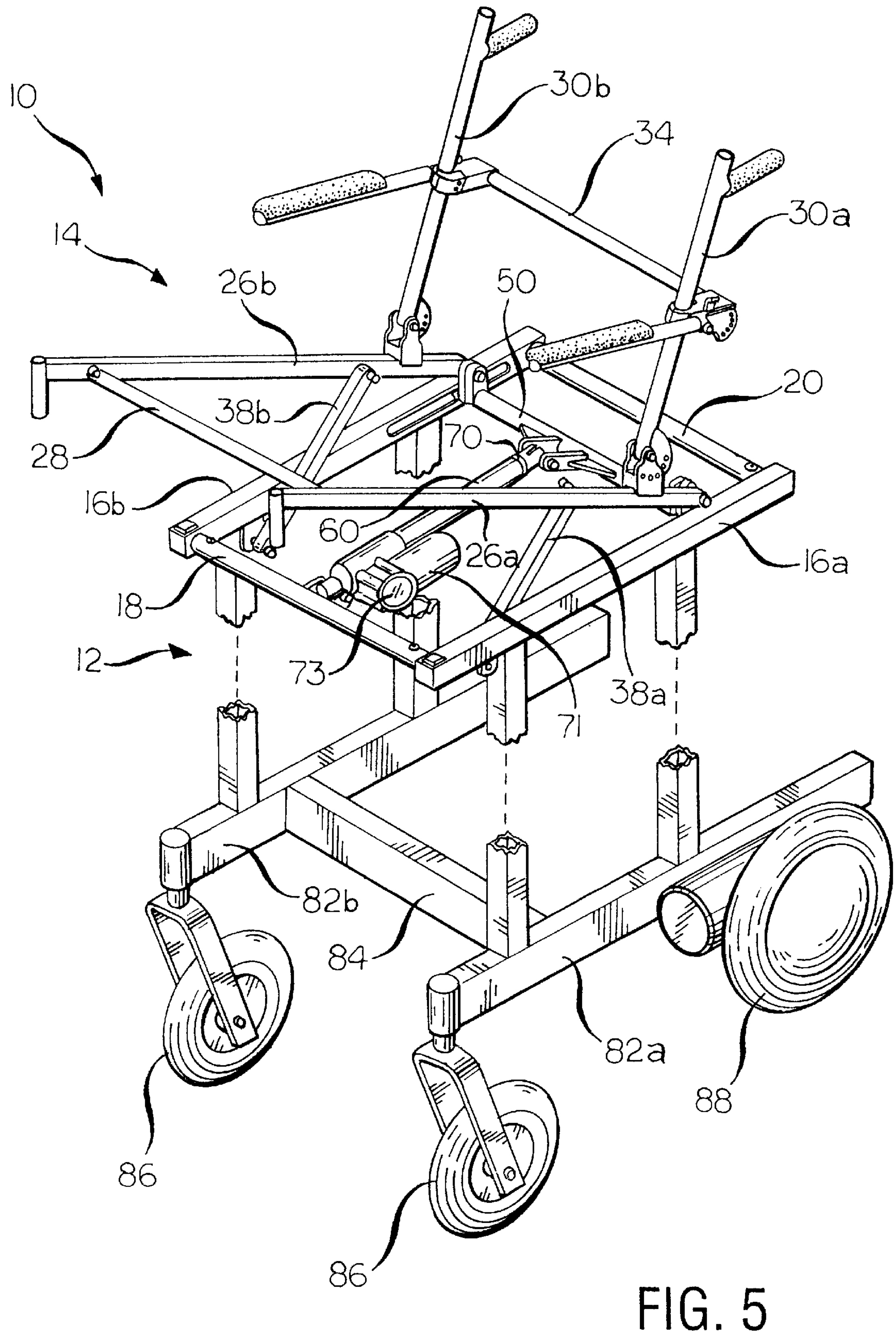
FIG. 5 is an exploded front perspective view of a tilting seat frame and a subframe in accordance with the present invention.

FIG. 5 shows the tilting seat frame 10 and the subframe 12 to which it can be attached. The base frame 12 in this embodiment includes two side members 82*a* and 82*b* and a cross member 84. Front wheels 86 and rear wheels 88 are mounted on the base frame 12. (The right rear wheel is not shown in FIG. 5.) Electric motors to drive the wheels and a storage battery to supply electricity to the drive motors and the linear actuator motor is usually also mounted on the base frame.

Figure 9:
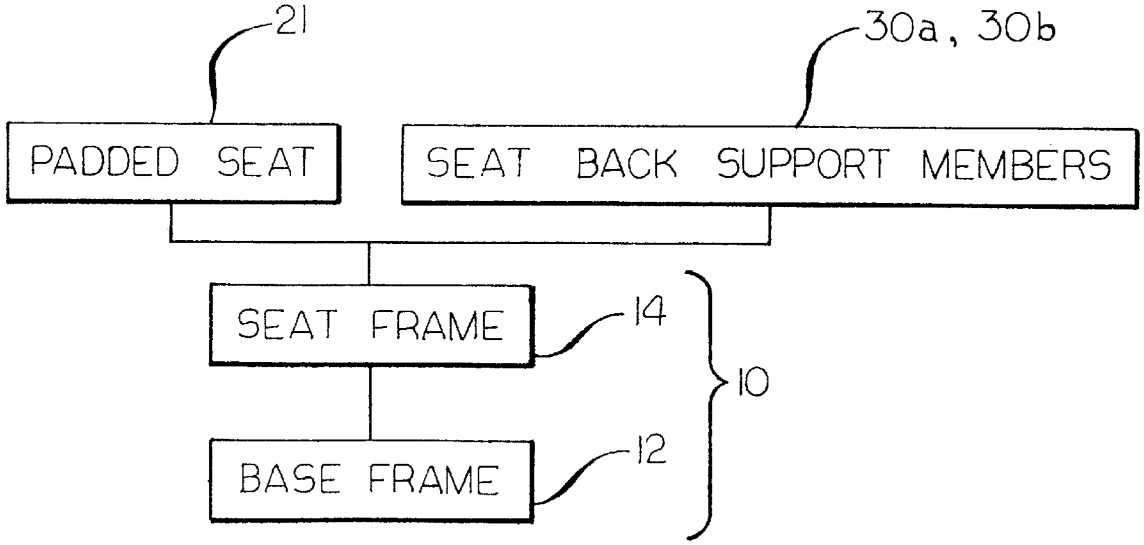
FIG. 9 is a diagrammatic representation of a wheelchair according to the present invention.

As indicated above, connections between the various members of the wheelchair frame 10 (namely, the base frame 12 and the seat frame 14 as shown in FIG. 9) can be made by means that are well known in the art. For example, bolts, welds, clamps, and the like can be used to make these connections. The various members of the wheelchair 10 (shown in FIG. 9) can be made from a variety of materials that are known to those skilled in this field. Steel would be one suitable material for the frame members.

The preceding description of specific embodiments of the present invention is not intended to be a complete list of every possible embodiment of the invention. Persons skilled in this field will recognize that modifications can be made to the specific embodiments described here that would be within the scope of the present invention.

The principle and mode of operation of this invention have been described in its preferred embodiment. However, it should be noted that this invention may be practiced otherwise than as specifically illustrated and described without departing from the scope of the invention.

What is claimed is:

1. A wheelchair seat tilt apparatus for tilting the seat frame of a wheelchair, the wheelchair comprising a base frame having base frame side members, the seat frame comprising a rear end and seat frame side members, the seat frame side members each having a front end and a rear end, said wheelchair seat tilt apparatus comprising:

a longitudinal retaining slot positioned in each base frame side member; and a longitudinally movable support member having opposing ends connected to said longitudinal retaining slots to form a longitudinally moveable connection, the rear end of the seat frame being connected to said longitudinally movable support member;

pivotable side connection members each having an upper end and a lower end; each said upper end being pivotally connected to one of the seat frame side members at a point on the seat frame side members that is forward of said longitudinally movable support member; each said lower end being pivotally connected to one of the base frame side members at a point on the base frame side members that is forward of said longitudinal retaining slot; and at least one drive member attached to said longitudinally movable support member, said drive member being capable of moving said longitudinally movable support member forward and rearward.

2. The wheelchair seat tilt apparatus of claim 1, wherein said drive member is powered by an electric motor mounted on the wheelchair frame.

3. The wheelchair seat tilt apparatus of claim 1, wherein said longitudinally movable support member has a rolling member at each said end, each said rolling member being located in one of said longitudinal retaining slots.

4. The wheelchair seat tilt apparatus of claim 3, wherein each said rolling member is a roller bearing.

5. The wheelchair seat tilt apparatus of claim 1, wherein the longitudinal retaining slot has a substantially rectangular cross-section.

6. The wheelchair seat tilt apparatus of claim 1, wherein said longitudinally movable support member has a sliding member at each said end, each said sliding member being located in one of said longitudinal retaining slots.

7. The wheelchair seat tilt apparatus of claim 1, wherein said drive member is a horizontally oriented linear actuator.

8. A wheelchair comprising:

a base frame comprising:

base frame side members each having a longitudinal retaining slot; and a longitudinally movable support member having opposing ends connected to said longitudinal retaining slot;

a seat frame, said seat frame being tiltable relative to said base frame, said seat frame comprising a rear end and seat frame side members, said frame side members each having a front end and a rear end, said rear end of said seat frame being connected to said longitudinally movable support member;

pivotable side connection members each having an upper end and a lower end, each said upper end being pivotally connected to one of said seat frame side members at a point on said seat frame side members that is forward of said longitudinally movable support member, each said lower end being pivotally connected to one of said base frame side members at a point on said base frame side members that is forward of said longitudinal retaining slot; and at least one drive member attached to said longitudinally movable support member, said drive member being capable of moving said longitudinally movable support member forward and rearward.

9. The wheelchair of claim 8, wherein said drive member is powered by an electric motor mounted on the wheelchair frame.

10. The wheelchair of claim 8, wherein said longitudinally movable support member has a rolling member at each said end, each said rolling member being located in one of said longitudinal retaining slots.

11. The wheelchair of claim 10, wherein each said rolling member is a roller bearing.

12. The wheelchair of claim 8, wherein the longitudinal retaining slot has a substantially rectangular cross-section.

13. The wheelchair seat tilt apparatus of claim 8, wherein said longitudinally movable support member has a sliding member at each said end, each said sliding member being located in one of said longitudinal retaining slots.

14. The wheelchair seat tilt apparatus of claim 8, wherein said drive member is a horizontally oriented linear actuator.

* * * * *

UNITED STATES PATENT AND TRADEMARK OFFICE

CERTIFICATE OF CORRECTION

PATENT NO. : 6,032,976
DATED : March 7, 2000
INVENTOR(S) : Dalva R. Alexander

It is certified that error appears in the above-identified patent and that said Letters Patent is hereby corrected as shown below:

On the cover page, below "United States Patent [19]",
change "Dickie et al." to -- Alexander --.

after "[75] Inventors:", delete "Paul C. Dickie, Clovis, Calif.;".

Signed and Sealed this

Twenty-seventh Day of February, 2001

Attest:

Nicholas P. Godici

NICHOLAS P. GODICI

*Attesting Officer* *Acting Director of the United States Patent and Trademark Office*